April 15, 1941.   L. F. CARTER   2,238,867
COMPENSATOR FOR GYROMAGNETIC COMPASSES
Filed Oct. 7, 1938   2 Sheets-Sheet 1

INVENTOR
LESLIE F. CARTER
BY
Herbert H. Thompson
HIS ATTORNEY.

April 15, 1941.  L. F. CARTER  2,238,867
COMPENSATOR FOR GYROMAGNETIC COMPASSES
Filed Oct. 7, 1938   2 Sheets-Sheet 2
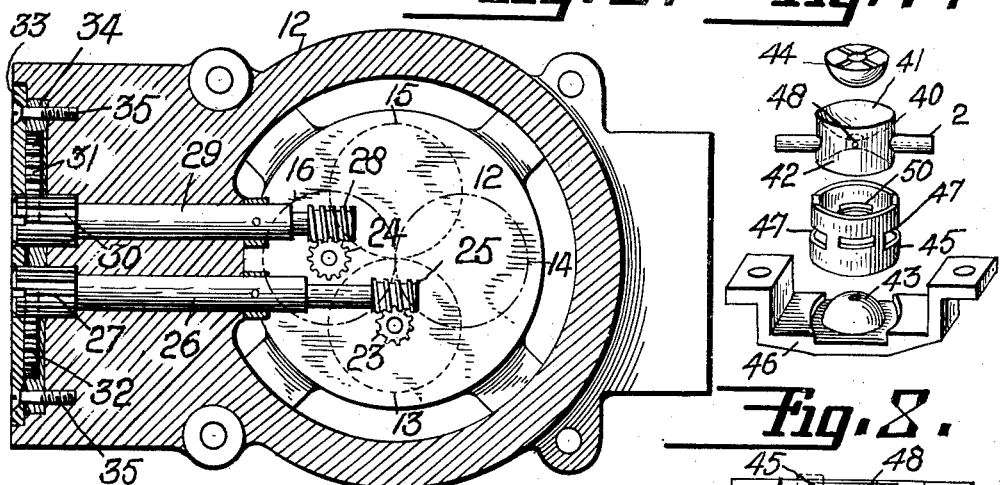
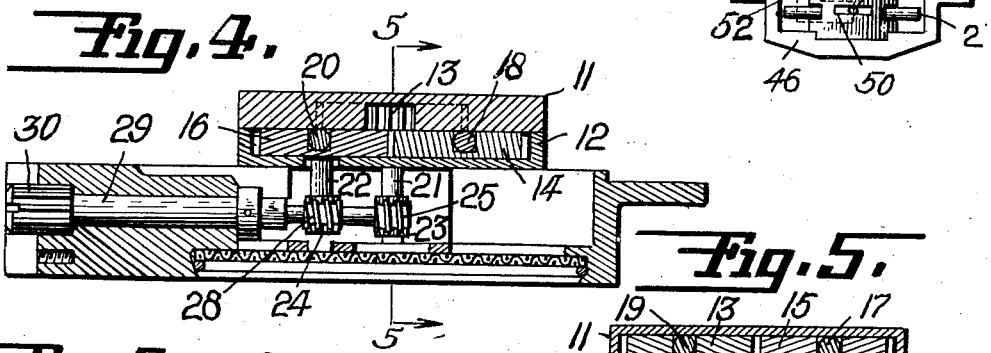
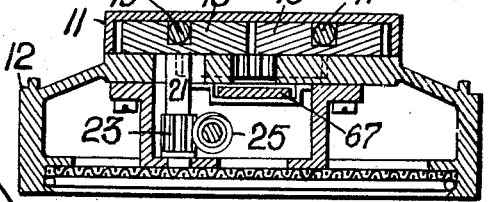
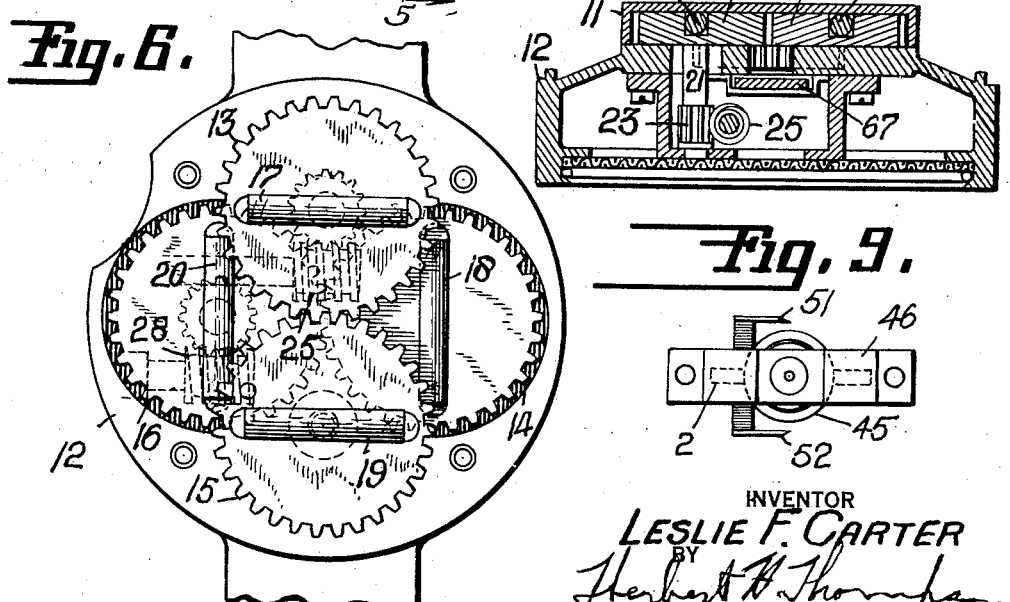
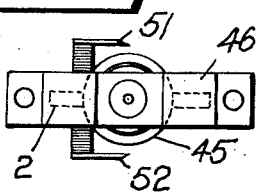
INVENTOR
LESLIE F. CARTER
BY
HIS ATTORNEY Patented Apr. 15, 1941

2,238,867

UNITED STATES PATENT OFFICE 2,238,867

COMPENSATOR FOR GYROMAGNETIC COMPASSES

Leslie F. Carter, Leonia, N. J., assignor to Sperry Gyroscope Company, Inc., Brooklyn, N. Y., a corporation of New York Application October 7, 1938, Serial No. 233,757

4 Claims. (Cl. 33—225)

This invention relates to magnetic compasses and especially to magnetic compasses of the kind carried on moving vehicles either on land, water, or in the air.

One purpose of the invention is to provide a novel compensator for the compass. As is generally known, magnetic compasses carried on a vehicle must be compensated for the masses of magnetic material used in the construction of the vehicle, as for instance, the hull in cases of ships, or the engine and other steel parts in cases of airplanes. This compensator usually consists of a series of permanent magnets which can be placed in such a position as to offset the effect of magnetic bodies in the vicinity of the compass. Without a compensator, misreadings of the compass would be inevitable. While the compensator is not able to eliminate the above errors completely, it will, however, enable the compass to give readings accurate enough for navigational use.

Another object of the invention is to provide a compensator with precalibrated dials for setting same. This will eliminate the necessity of applying compensation by an arbitrary method of guessing and going over the same adjustments time and again. It also will eliminate the difficulty of keeping in mind the correct sense of turning of the compensator adjustments when going from one heading to another. As those skilled in the art know, the compensators are adjusted after the compass has been mounted in its permanent place in the ship by turning the ship from one heading to another and allowing the compass to settle after each adjustment. After the compass is mounted on an airplane, for instance, the tail of the plane is jacked up until the ship is in its normal flying position and then the whole ship is turned to a north-south heading, then to an east-west heading, making proper adjustments in each position. After these main adjustments have been finished, the ship is turned to inter-cardinal headings and, for ultimate refining, compass readings are taken every 15°. It is necessary to wait after each adjustment for the compass to settle, and a large amount of time is required for repeated adjustments of the compass, if no calibrated dial is provided. As, furthermore, compasses have to be recompensated at frequent intervals, the expense of keeping the compass compensated is nearly in direct proportion to the total time required. One object of this invention is to provide means by which this time can be reduced considerably, consisting of a calibrated dial on each of the compensators telling definitely just how far and in which direction to turn the compensator adjustment to obtain the desired results.

To fully explain the design and use of my novel compensator, I show it applied to a gyromagnetic compass, as fully explained and described in the co-pending application of M. F. Bates, now Patent No. 2,161,241, dated June 6, 1939, and the present invention incorporates several important improvements thereto. It should be understood, however, that the method and the apparatus for compensating a magnetic compass is not restricted to the use with gyromagnetic compasses but is generally applicable to any and all types of magnetic compasses.

Referring to the drawings illustrating one preferred form of my invention,

Fig. 3 shows the bottom view of the compensator partly in a cross-section taken along line 3—3.

Fig. 4 is an enlarged view of the lower part of Fig. 1 showing the compensator case in cross-section and leaving out certain parts not essential to the compensator.

Fig. 5 is a vertical cross-section through the compensator as shown in Fig. 4 but along line 5—5 of Fig. 4.

Fig. 6 is a top view of Figs. 4 and 5 with the top cover removed to show the compensator magnets.

Fig. 7 shows an exploded view of the magnet carrier of the gyromagnetic compass of Fig. 1.

Fig. 8 shows a side elevation of the magnet carrier.

Fig. 9 is a bottom view of the magnet carrier, showing the relation between the air jets and vanes.

Figures 1, 10:
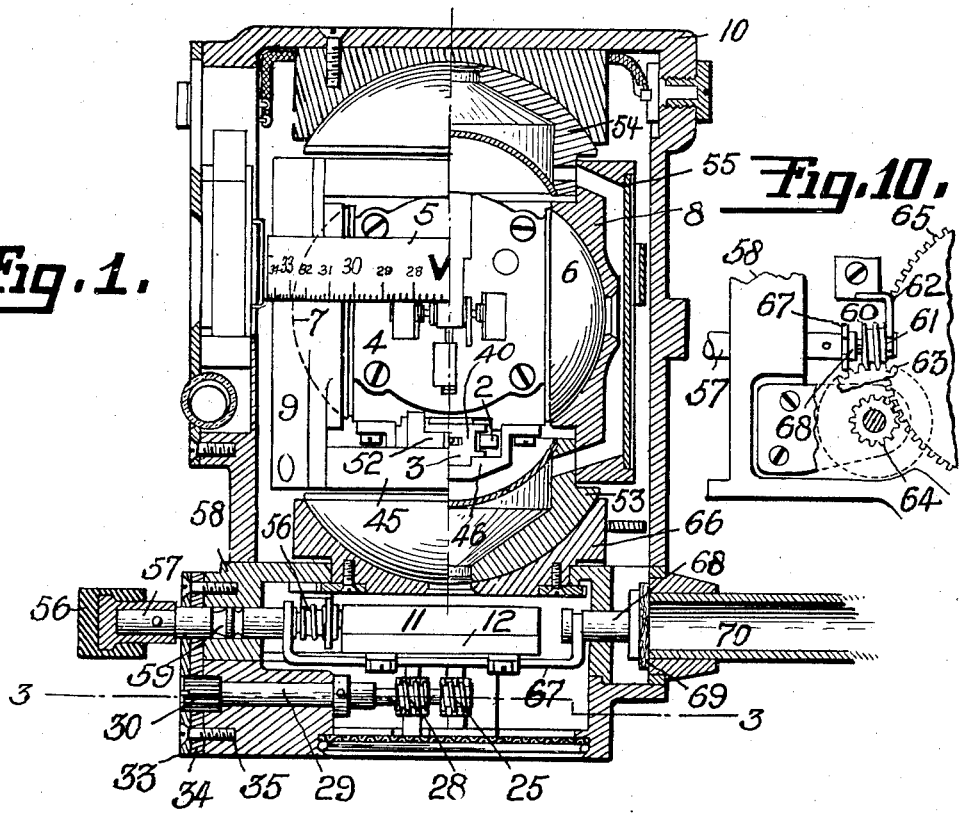
Fig. 1 shows a vertical cross-section through the compensator of a gyromagnetic compass, the compass part of which is shown partly in vertical cross-section and partly in elevation.
Fig. 10 shows a bottom view of the resetting device.

Referring now to Fig. 1, 2 is the magnet in a gyromagnetic compass. As described in the aforementioned Patent 2,161,241, this magnet forms the magnetic element of the gyromagnetic compass and is mounted in an air supported member 40 in such a way as to be free to swing in a horizontal plane and to align itself with the direction of the earth's magnetic flux. As shown in Figs. 7 and 8, the member 40 has its top and bottom hollowed out to form spherical depressions 41 and 42. These depressions are interconnected by a center hole so as to allow air to pass from one end to the other. This hole has a diameter large enough to prevent its blocking by the magnet 2. The spherical depressions 41 and 42 fit closely over spherical buttons 43 and 44, but a small airgap is allowed therebetween. Air is introduced into channels or holes in the buttons, so that the member 40 floats on air films without actually being in contact with the supporting buttons. A cage or screen 45, which is pressed into the bridge 46, is so designed as to prevent any air eddies from touching the member 40. This screen has slots 47 for limited movement of the magnet bar and its inner diameter is slightly larger than the outer diameter of member 40, so that no mechanical friction can impede the free floating member 40. A small transverse hole 48 is drilled clear through member 40, through which air escapes, forming two jets, the reactions of which neutralize each other, as they are equal and opposite. The air streams can escape through slots 49 and 50 in the screen 45 and finally impinge partly upon two vanes 51 and 52 as shown in Figs. 9 and 1. These vanes normally absorb equal parts of the total jet reaction and are carried on the gyro housing 4, containing an air spun compass rotor in known manner. The housing 4 has spherical ends 6 and 7 and is carried on a film of air in the cups 8 and 9 for oscillation around a horizontal axis. The cups 8 and 9 again are carried by a similar arrangement of spheres and cups 53 and 54 and a frame 55 in the main housing 10 of the compass which also carries the compass lubber line. The frame 55 also carries the compass card 5, graduated in degrees. If now the member 40 moves under the influence of the earth's magnetic field, the normal balance of the effect of the air jets is destroyed, because one of the vanes will absorb more of the jet reaction than the other one, resulting in a torque around the horizontal axis of the housing 5, thereby causing the gyro to precess in a direction to follow the motion of magnet 2.

Underneath the magnets 2 is mounted the casing 11 of non-magnetic material, in which the compensator magnets are contained. Figure 4 shows that the casing 11 is formed as a cover for a fixed member 12. Four gears 13, 14, 15, 16 are held between the member 12 and the member 11 in counter-bored recesses as shown in Fig. 6. Gears 13 and 15 mesh with each other and gears 14 and 16 also mesh with each other. Each of the gears has a milled slot in which small round magnets 17, 18, 19 and 20 are located in such a way that in the normal or neutral position north and south poles are alternating so that the magnetic effect of all four magnets upon the magnetic sensitive member of the compass is zero. To this end, the four magnets as shown in Fig. 6, are arranged in the form of a hollow square for zero compensation thereby forming a substantially closed magnetic circuit symmetrical about the vertical axis of rotation of the magnets 2. Gears 13 and 16 each have a shaft 21 and 22 respectively. Shaft 21 carries a worm 23 while shaft 22 carries worm 24. Gear 23 can be turned by a worm 25 attached to a shaft 26, the outer end of which is formed as a pinion 27 with a screw driver slot on the face of it. Similarly, gear 24 is turned by a worm 28 attached to the shaft 29, the outer end of which is shaped as a pinion 30, also having a screw driver slot adapted to receive a screw driver for turning the shaft. It is obvious that the relative position of the compensator magnets 17, 18, 19 and 20 can be adjusted at will by turning the pinions 27 and 30. The magnets 17 and 19 will turn together in opposite directions for N-S compensation while magnets 18 and 20 will turn together but in opposite sense for compensation in the E-W direction.

Figure 2:
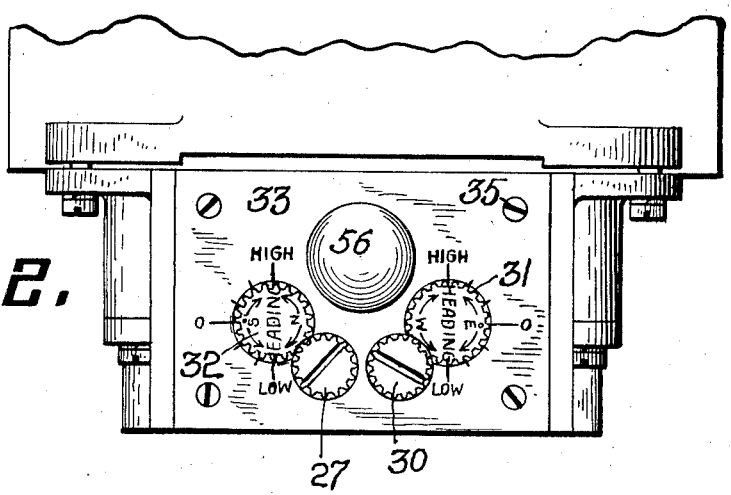
Fig. 2 shows an enlarged view of the compensator setting knobs and dials looking at the left side of Fig. 1.

As shown in Figs. 2 and 3, the pinion heads 30 and 27 of shafts 29 and 26 mesh with two dial gears 31 and 32 respectively. Dial gear 32 is intended for use of the north-south heading and has been engraved accordingly. The zero position of this dial is reached when the dot opposite the figure "S" is in line with the engraved zero mark on plate 33. Similarly, dial 31 is at zero, when the dot over the "E" is opposite the engraved zero line. This plate is made of a transparent material and has a number of graduations and the words "High" and "Low" engraved in it to facilitate the setting of the dials 31 and 32. The compensators are at their neutral setting when the dials are on the zero mark. In this position of the dials, the magnets are positioned as shown in Fig. 6. The dial gears 31 and 32 are located in recesses in plate 34 and both the plate 34 and the transparent plate 33 are together fastened to the member 12 by means of screws 35.

Each of the graduations shown on the face of the transparent plate 33 means a definite amount of change of reading of the compass, say 5°. In actual operation, if on a north-south heading the compass should read 5° low, the N-S compensator dial would be turned by means of pinion 30 until its zero mark is opposite the first graduation in the direction towards the engraved word "High." Similarly the E-W compensation will be carried out by turning the dial 32 the proper amount to compensate for high or low readings of the compass. If readings are taken at inter-cardinal points, the amount of misreading of the compass card has to be proportionally divided between the E-W and N-S compensator and each dial has to be turned accordingly.

As the compass shown in the drawings is a gyro driven compass influenced by a magnet, the compass card will not immediately settle to its new position. It will do so, however, during the time required to turn the ship through an angle of 180°, so that no time is lost while waiting for the compass to settle. Furthermore, the fact that the compensator dials show exactly how much and in which sense the compass reading will change for a given amount of turn of that dial, it is not necessary to guess as to the amount of correction. The dial is simply turned to a value agreeing with the compass error. In contrast to this simple method, guesswork has to be employed if no calibrated dials are available. In that case, the operator has to wait for the compass to settle out and make one or more additional adjustments before he finds the correct setting of the compensator. Also, by the time the ship has been turned 180°, he may have forgotten in which direction he did turn the shaft and thereby lose valuable time while he tries to find the correct sense of rotation by the trial and error method.

In order to be sure that the dial indicators of the compensators correspond exactly to deviations of the compass card, it is necessary to calibrate accurately not only magnets 2 of the compass but also the magnets 17, 18, 19, 20 of the compensator. This is accomplished by magnetizing the magnets 2 not for the maximum they will absorb but only to a point below that maximum, which can always be reached to a certainty and which is checked by comparison with a standard magnet or by other methods well known in the art of measuring magnetic flux. This method insures uniformity of magnets 2, because changes in the steel alloy may cause differences in the amount of ampere-turns necessary to fully magnetize the member, and the maximum flux obtainable may vary within considerable limits. After having first secured uniform magnetic strength of the sensitive element it now is necessary to follow the same method with the compensator magnets, taking into account the fact that the magnets 17 and 19 are nearer to the sensitive element than the magnets 18 and 20. Consequently, the first named magnets will be magnetized slightly less than the last named magnets. These magnets also are brought to a definite predetermined magnetic strength by one of several well known methods of magnetic measurement so that the amount of influence of these magnets on the sensitive element can be accurately predicted.

This method of precalibration of the magnets employed in the sensitive element and in the compensator together with calibrated dials make it, therefore, possible to know in advance what will happen if the compensator is turned a definite number of degrees. The dial markings enable the operator to determine without fail or loss of time the sense of direction and amount of rotation of the dials in order to obtain a given amount of compensation so that the combination of calibrated magnets with calibrated dials insures a quick and accurate method of obtaining full compensation on all headings. Actual experience shows that the time necessary to fully compensate the compass with this type of compensation is cut down to a fraction as against the formerly employed trial and error method.

A resetting device is used on the gyromagnetic compass in order to quickly orientate the compass, if this should be necessary. Fig. 1 and Fig. 10 show the means employed. A knob 56 is mounted for motion in two dimensions, so that it can be depressed as well as rotated. For this purpose, the shaft 57, to which knob 56 is affixed, has a sliding bearing in casting 58 and two detents 59 to terminate the lengthwise travel of the shafts. These detents are engaged by a small steel ball under spring tension, not visible in the drawings. The free end of shaft 57 forms a sleeve and carries slidably therein the shaft of worm 60, which is held against relative rotation by a pin in the sleeve and an axial keyway in the worm shaft. The worm itself is held against axial movement by a collar 61 engaged in a slot in bracket 62, which is fixed to casting 58. If now knob 56 is depressed, the sleeve will slide over the shaft of worm 60, but the worm will remain stationary. If the knob turns, the worm will also turn, and thereby rotate the cup 66 through gears 63, 64, 65. As the knob is first depressed before it is turned, the U-shaped member 67 is moved from left to right, the shaft 57 engaging a slot in member 67 by means of collar 68. The other end of member 67 carries a pin 68 and a rubber valve plate 69 arranged for blocking the air line 70 through which the compass casing is being evacuated. This results in disappearance of the air films in all of the air supported bearings on the vertical and horizontal axis, thereby locking the gyro casing 4 mechanically to cup 66, so that it can be rotated by turning knob 56. The gyro itself, coasts during the short interval of resetting. Pulling knob 56 outward opens valve 69 and restores the air bearings to normal function.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described my invention, what I claim and desire to secure by Letters Patent is:

1. In a compensator for magnetic compasses, two pairs of compensating permanent magnets of predetermined measured magnetic strength, the magnets of each pair being parallel when positioned for zero compensation and the two pairs in said position forming a square in which adjacent magnetic poles are of opposite sign thereby comprising a substantially closed magnetic circuit, two pairs of mutually meshed gears each carrying one of said magnets, a shaft for each of said pairs of gears to change their relative position, an indicator for each of said shafts, markings on said indicators to indicate the sense of compensation, and graduations cooperating with said markings showing substantially the amount of compass deviation produced by said compensation.

2. In a gyromagnetic compass adapted to be mounted on the panel of an aircraft, an outer casing, a vertical ring pivotally mounted therein for turning about a vertical axis, a rotor bearing frame pivoted therein for oscillation about a horizontal axis, a magnetic element pivoted below said frame for turning about a vertical axis, normally in line with said other vertical axis, compensating magnets mounted in the lower part of said casing adjacent said element forming a hollow square in their arrangement for zero compensation, thereby forming a substantially closed magnetic circuit symmetrical about said vertical axis and in a plane normal thereto, and manual means for equally and oppositely adjusting the individual magnets of opposite sides of said square from without said casing and from the front of said panel.

3. A compensator for magnetic compasses comprising a plurality of magnetic members of a material having high coercive force magnetized to a predetermined strength and positioned for zero compensation in a square, said magnetic members being then so poled that their respective magnetomotive forces all act in series to cause flux to be circulated around said square in a substantially closed path without influence upon the compass and said members being adapted when moved from said position to cause deviation of the compass, means to turn the members of each respective pair equally and oppositely to cause compensating deviations respectively at two cardinal compass points and calibrated indicating means associated with said means to accurately predetermine said deviation.

4. A compensator for a gyromagnetic compass comprising a plurality of permanent bar magnets of calibrated magnetic strength positioned in a plane and arranged, when in the zero compensating position, as a plurality of pairs of parallel elements forming a substantially closed magnetic circuit symmetrically arranged about a centrally located point, the magnetomotive forces of all said magnets acting in series to cause flux to circulate about said closed circuit with a minimum of leakage and thereby to cause the resultant field in a plane parallel to said magnet plane and at a point on the normal thereto through said central point to be substantially zero and the field along said normal to be a minimum, means for simultaneously rotating the magnets of each pair in opposite directions about an axis normal to the plane in which they lie until the required compensating field is produced, and means for predetermining the required degree of rotation to produce a desired compensating effect in a plane parallel to said magnet plane.

LESLIE F. CARTER.